Figure 1:
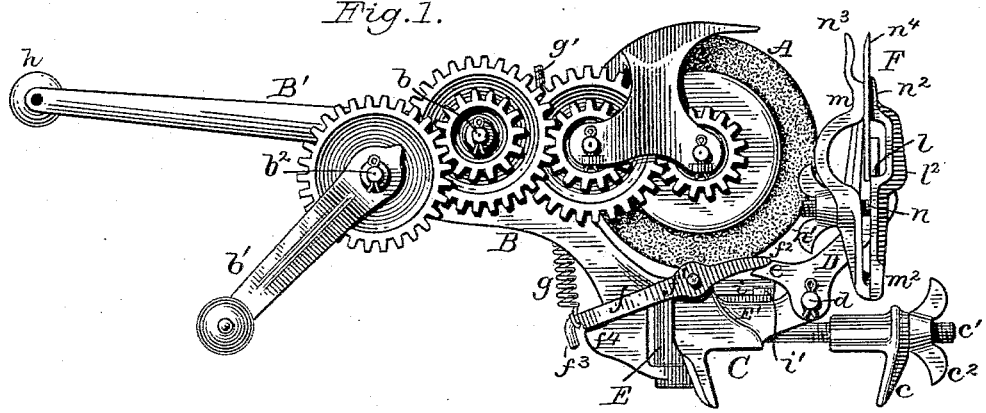

(No Model.) 6 Sheets—Sheet 1.

R. DUTTON.
MACHINE FOR GRINDING MOWER KNIVES.

No. 359,964. Patented Mar. 22, 1887.

Attest:
Philip F. Larner
Lowell Bartle

Inventor:
Rufus Dutton,
By Wm C Mason
Attorney.

(No Model.) 6 Sheets—Sheet 2.
R. DUTTON.
MACHINE FOR GRINDING MOWER KNIVES.
No. 359,964. Patented Mar. 22, 1887.
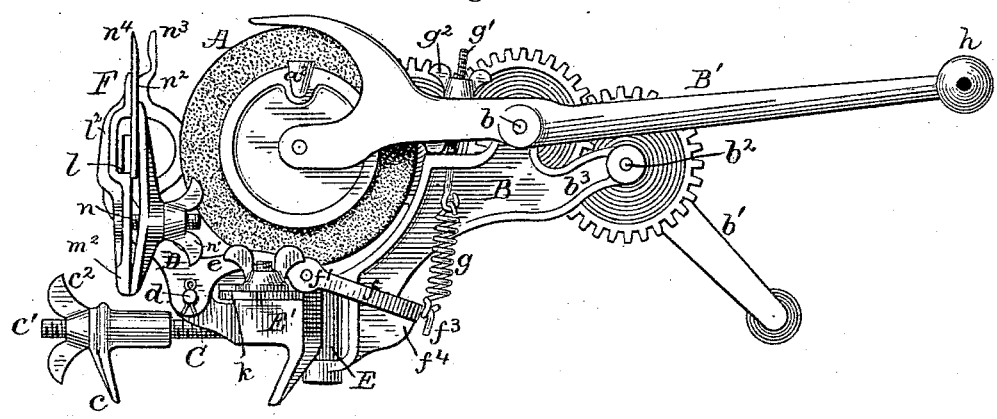

(No Model.) 6 Sheets—Sheet 3.

R. DUTTON.
MACHINE FOR GRINDING MOWER KNIVES.

No. 359,964. Patented Mar. 22, 1887.

Attest:
Philip F. Larner.
Lowell Barth.

Inventor:
Rufus Dutton.
By Wm. C. Mead
Attorney.

(No Model.) 6 Sheets—Sheet 4.
R. DUTTON.
MACHINE FOR GRINDING MOWER KNIVES.
No. 359,964. Patented Mar. 22, 1887.
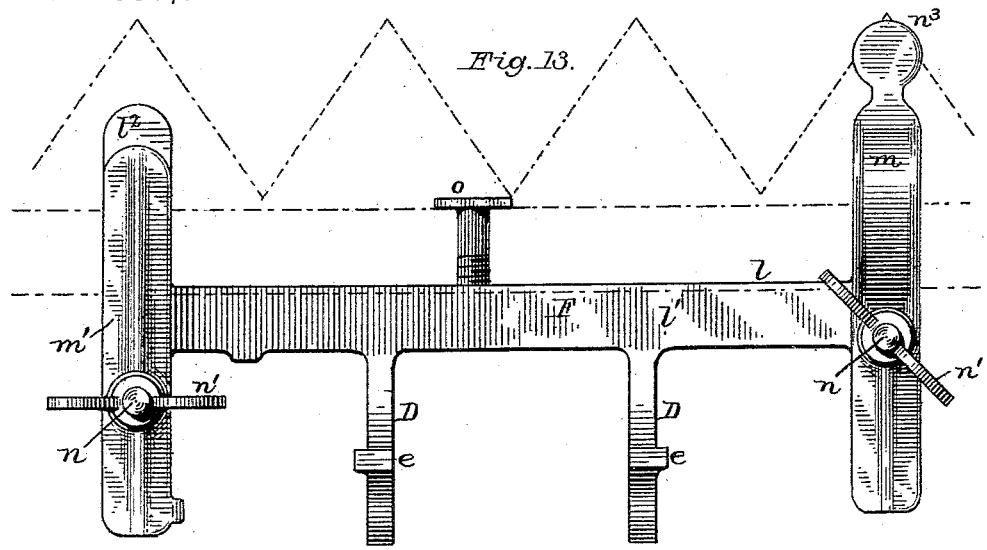
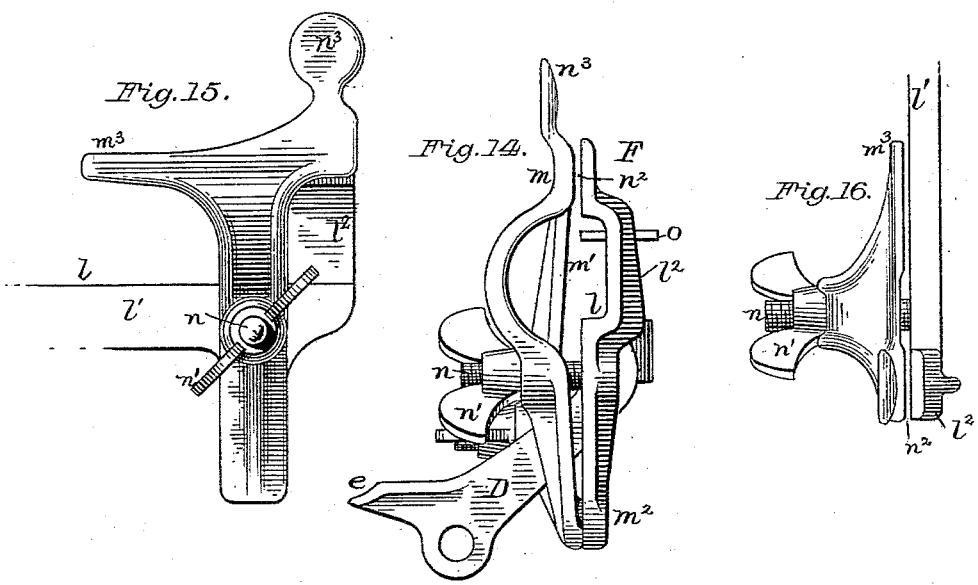
Attest:
Philip F. Larner
Howell Battle
Inventor:
Rufus Dutton
By [signature]
Attorney (No Model.) 6 Sheets—Sheet 5.

R. DUTTON.
MACHINE FOR GRINDING MOWER KNIVES.

No. 359,964. Patented Mar. 22, 1887.

Attest:
Philip F. Larner
Howell Bartt

Inventor:
Rufus Dutton
By M. C. M.
Attorney (No Model.) 6 Sheets—Sheet 6.
R. DUTTON.
MACHINE FOR GRINDING MOWER KNIVES.
No. 359,964. Patented Mar. 22, 1887.
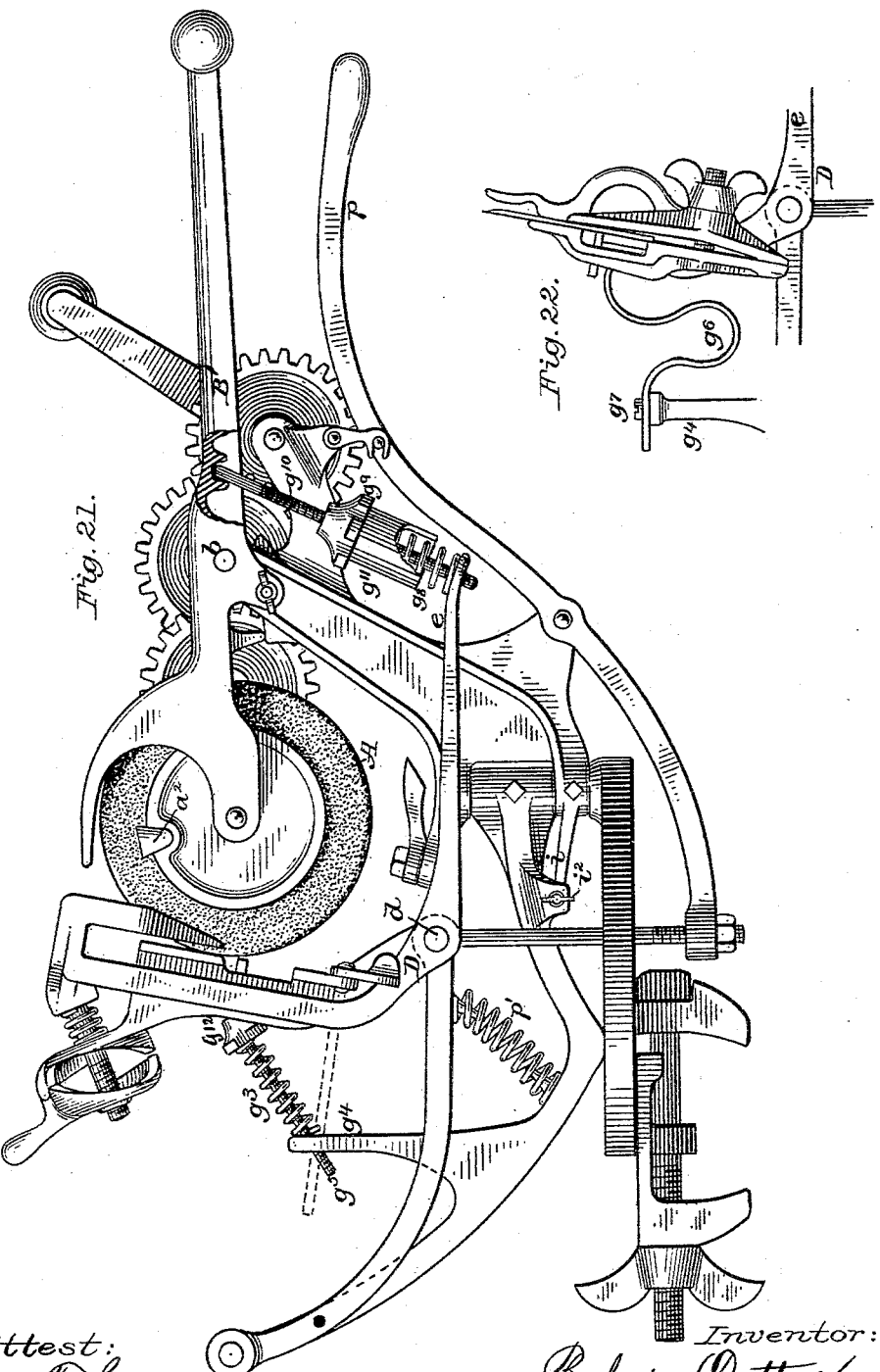

UNITED STATES PATENT OFFICE.

RUFUS DUTTON, OF YONKERS, ASSIGNOR TO THE MOWER KNIFE GRINDER COMPANY, OF NEW YORK, N. Y.

MACHINE FOR GRINDING MOWER-KNIVES.

SPECIFICATION forming part of Letters Patent No. 359,934, dated March 22, 1887.

Application filed October 14, 1886. Serial No. 216,248. (No model.)

*To all whom it may concern:*

Be it known that I, RUFUS DUTTON, of Yonkers, in the county of Westchester and State of New York, have invented certain new and useful Improvements in Machines for Grinding Mower-Knives; and I do hereby declare that the following specification, taken in connection with the drawings furnished and forming a part thereof, is a clear, true, and complete description of the several features of my invention.

My said improvements have all been devised with special reference to their use in connection with that class of machines which were disclosed in my Letters Patent No. 342,290, dated May 18, 1886, although some of the features now disclosed have more or less value when applied to other types of mower-knife grinders.

One of the most important features of my present invention is believed to be radically new and of equal value in any mower-knife grinder wherein spring-pressure is relied upon for maintaining contact between the knife and grinding-wheel during the actual grinding operation, and also wherein either the wheel or the knife-clamp is reciprocated for progressively grinding the edge of a knife-section from the bottom to its tip.

In all prior machines the spring which controls the knife-clamp exerts greater force and causes heavier contact of the knife with the grinding-wheel while grinding the bottom of each knife-edge than while grinding the tip or upper or outer portion of the same edge, because of the fact that although the spring is compressed by the rearward deflection of the knife-clamp, as when grinding at the tip of a knife-section, the effective force of the spring is greater while grinding at the bottom of the V, which is nearer the fulcrum or pivot of the knife-clamp or its frame than the outer end or tip of the knife-edge. The application of the greatest spring-pressure while the grinding-wheel is operating on the bottom of the V of a knife as heretofore is obviously bad in principle, inasmuch as the outer portions of each edge do more work and are consequently more liable to wear than the inner portions, and hence the latter will usually need less grinding, and instead of being ground under the greatest available pressure said inner portions should be ground under a pressure at least no greater than when the outer portions are being ground; or, in other words, it is highly advantageous if the spring-pressure be practically equalized, so as to secure a uniform contact-pressure while grinding all portions of an edge; but I deem it best to have the pressure somewhat greater while grinding near the tip of a knife-section than while grinding at the bottom of the V, and I have therefore for the first time so organized a knife-clamp-controlling spring with the grinding-wheel frame and the clamp-frame that the spring will exert its minimum force while the grinding-wheel is in contact with the bottom of a knife-edge, and then progressively increase its force as the point of contact is gradually moved toward the tip of the knife-edge or section. Although I have provided for this progressively-increased pressure while grinding outward and a gradually-decreased pressure while grinding inward on a knife-edge, my spring can be so adjusted as to enable the pressure to vary so little as to make it practically uniform.

Another feature now devised by me is specially applicable to such machines as were disclosed in my aforesaid Letters Patent, and in which the grinding-wheel frame and the knife-clamp frame are swiveled together and movable in the arc of a circle centering within the grinding-wheel. In said machines stops are employed for limiting the swiveling movement; and as heretofore organized by me said stops were absolute in their operation and fixed in their positions, which rendered the machines thoroughly satisfactory when used for grinding new knives, or even old knives which had only been ground in my machines; but a knife having more or less irregularly-ground knife-sections, as a result of their having been previously ground upon an ordinary grindstone or by means of other types of grinding-machines, requires that there should be a capacity for a special adaptation to each knife-section in order to widen the range of usefulness of said machine.

In this connection another feature of my invention consists in providing swiveling stops which are adjustable, so that they may be moved toward the right hand or toward the left and be then firmly fixed in position. Thus, while restricting the extent of the swiveling movement as between the knife-clamp frame and the wheel-frame, the same as in my prior machines, I now further provide for a variable location of said stops to enable the swiveling movement between the knife-clamp frame and the wheel-frame to be correspondingly varied.

Another feature of my present invention is mainly restricted in value to use in that form of machine disclosed in my said Letters Patent, in which the grinding-wheel is mounted at the end of an arm pivoted upon the wheel-frame, so as to allow the wheel to be vertically reciprocated by the hand of the operator applied to a handle at the opposite end of said arm. In my said prior machine the wheel-driving crank and the driving-gear coupled to said crank were located at and upon the pivot by which the wheel-arm and wheel-frame were connected, and while that arrangement is highly effective I have found that some persons, while operating the crank with the right hand and controlling the wheel with the left hand, experience more or less difficulty in preventing the power applied through the crank from adversely affecting the desired control of the grinding-wheel, and I have greatly remedied this by providing an independent base for the crank and its gear and meshing the latter with an intermediate gear which is mounted upon the wheel-arm pivot, and as a further result of this change and its accompaniments the machine is rendered more compact and much lighter in weight than my prior machines of this general form.

With a view to further lessening the weight of the machine, as well as its cost, I now employ a knife-clamp embodying certain novel features and of simpler construction than those used in my prior machines, which, with the other changes now made, enable me to produce a thoroughly-effective machine, weighing only about two-thirds as much as machines of the same general class as heretofore produced by me.

In my prior machines a chambered grinding-wheel is employed for the reception of water, and I employ such wheels in my present machines; but I have now so improved them that water can be more conveniently introduced and retained therein. In my prior wheels a feed-duct and a plug were employed; but I have now provided a duct which need never be closed and which can be provided with a mouth, by which water can be readily supplied to the wheel while it is in its working position and without the aid of a funnel or other special contrivance.

To more particularly describe my invention I will refer to the accompanying six sheets of drawings, in which—

Figure 2:
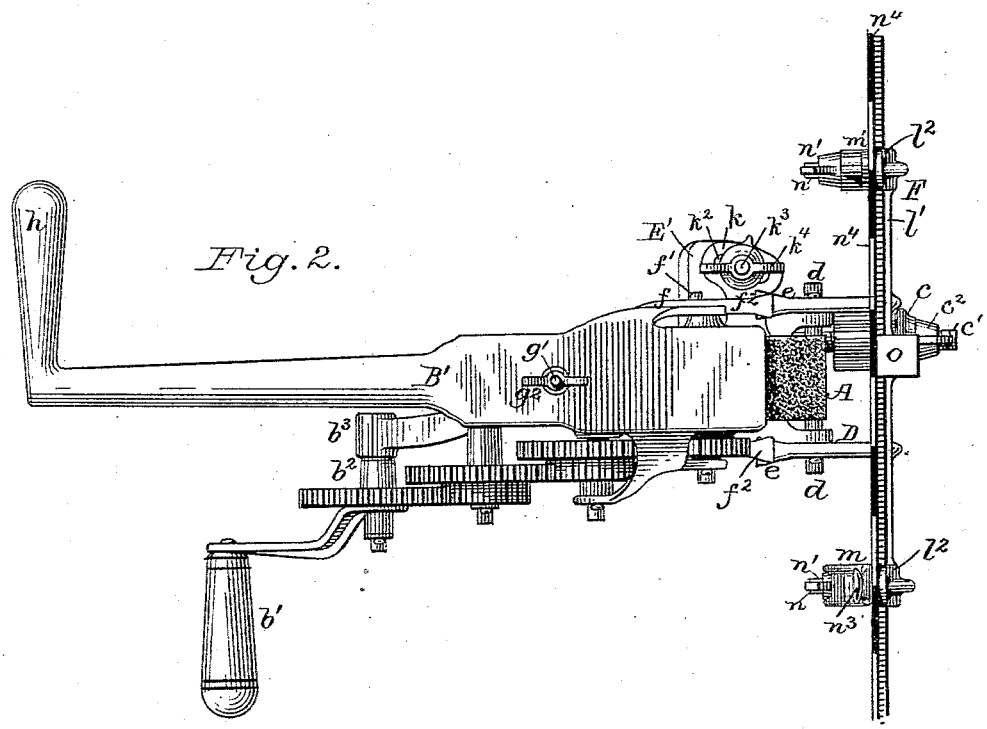
Figure 9:
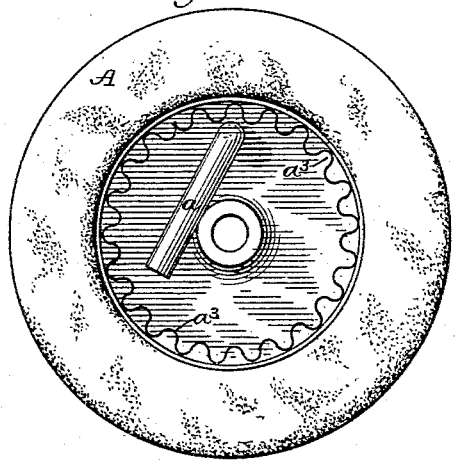
Figure 10:
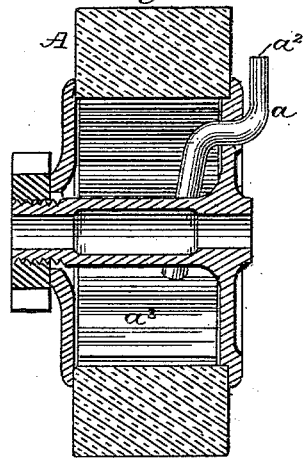
Figure 11:
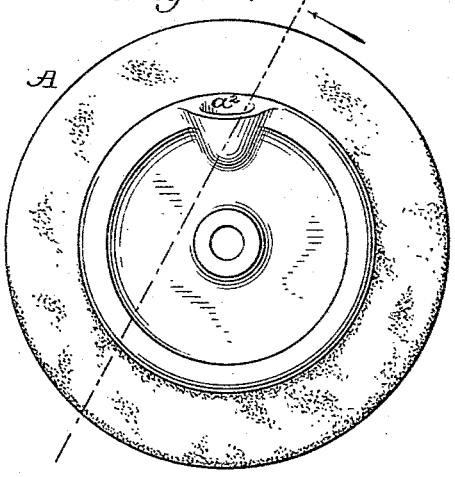
Figure 12:
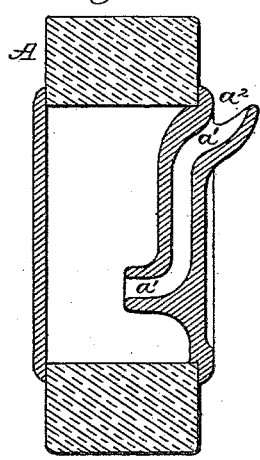
Figure 17:
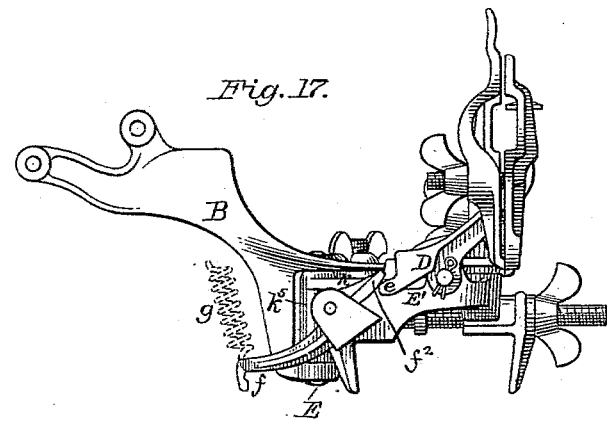
Figure 18:
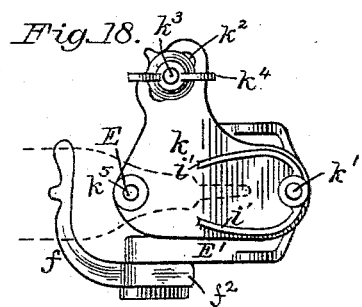
Figure 19:
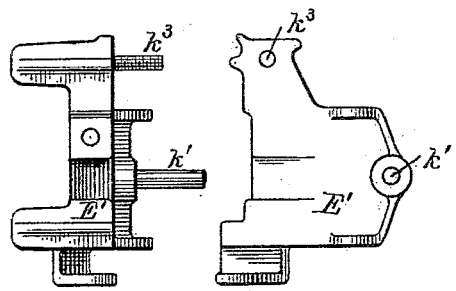
Figure 20:
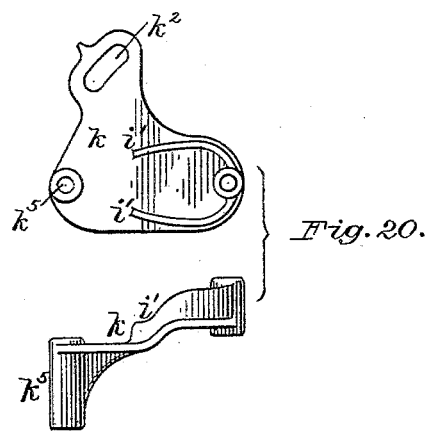

Figure 1, Sheet 1, is a side view of a simple form of my machine embodying all of my present improvements. Fig. 2 is a top view of the same. Fig. 3, Sheet 2, is a side view opposite to that in Fig. 1. Figs. 4 and 5 are, respectively, side and top views of such portions of this machine as relate to varying the angular adjustment of the grinding-wheel and knife-clamp. Figs. 6 and 7, in two views, illustrate a plate-metal spring for controlling the knife-clamp. Fig. 8 illustrates a rubber spring for controlling the knife-clamp. Figs. 9 and 10, Sheet 3, in two sectional views, illustrate the chambered grinding-wheel provided with my novel water-feeding duct. Figs. 11 and 12, in side and sectional views, illustrate the grinding-wheel provided with my feeding-duct in another form. Fig. 13, Sheet 4, is a front view of a knife-clamp detached, a portion of a mower-knife being therein indicated in dotted lines. Fig. 14 is an end view of said clamp and also of the lever by which it is in part controlled in its relations to the grinding-wheel. Figs. 15 and 16, in front and top views, illustrate one pair of knife-clamping jaws in a modified form. Fig. 17, Sheet 5, in side view, illustrates a base-clamp, a knife-clamp, a portion of the wheel-frame, and the adjustable stop devices in a modified form. Fig. 18 is a top view of the base clamp-plate and adjustable stop-plate of Fig. 17 with the knife-clamp removed but having a portion of the wheel-frame shown in dotted lines. Fig. 19, in end and top views, illustrates said clamp-plate detached. Fig. 20, in side and top views, illustrates the plate which carries the adjustable stops detached from the clamp-plate. Fig. 21, Sheet 6, is a side view of a complex form of my machine capable of various modes of operation, and illustrating the main features of my present invention as applied thereto. Fig. 22 is a side view of a vertically-reciprocating knife-clamp having a bent spring arranged to progressively increase its force during the downward movement of the clamp.

The grinding-wheel A, as in my prior machine, is chambered for the reception of water, which is delivered through the grinding-face as a result of the rotation of the wheel. In lieu of the plugged aperture or feed-hole heretofore used by me, I now employ a feeding-duct which requires no closing. This duct can be somewhat varied in its form; but it must have an entrance or mouth to allow water to flow downward and inward and an exit within the wheel at such a point with relation to the mouth that water cannot flow outwardly from the chamber, either when the grinding-wheel is at rest or in motion. As shown in Figs. 9 and 10, the feeding-duct is in the form of a bent tube, $a$, inserted tightly through a hole in one of the wheel-flanges and extended radially a little beyond the axis of the wheel. In Figs. 11 and 12 the duct $a'$ is within exterior and interior webs cast integrally with one of the wheel-flanges. Either form enables water to be supplied to the chamber through the open mouth $a^2$, which of course could be plugged if any one desired so to do; but it will obviously be wholly unnecessary, because in whatever position the machine or the grinding-wheel may be water cannot flow outwardly unless it be greatly in excess of a desirable quantity. When the wheel is in motion, the entire liquid contents of the chamber will of course be annularly distributed therein, and evenly, and hence there will be no tendency for the water to pass outwardly through a duct which occupies in the wheel a line more or less radial.

With a considerable body of water within the wheel, it is sometimes delivered too freely through the grinding-face, and to prevent this I use a water-guard, $a^3$, composed of an annular band or strip of any material not freely pervious to water, and, while heavy cloth or felt might serve a good purpose, I prefer to use thin sheet metal, corrugated as shown, and laterally so occupying the chamber as to not wholly prevent water from passing toward the grinding-face of the wheel. This water-guard could, however, be so tightly clamped between the wheel-flanges as to prevent water from passing at its edges; but in that case a few small perforations should be provided.

A cheap and fairly-effective water-guard may be provided in the form of an interior impervious coating to portions of the annular surface of the grinding-wheel, thus lessening the area of exposure to penetration.

Referring specially to Figs. 1 to 5, I will describe the wheel-frame B, which differs in some more or less important features from that of any of my prior machines; but most of said variations are incident to the presence of the more important features of my invention. As in my prior machines, said wheel-frame is composed of a bracket swiveled upon a bed-plate and a wheel-arm, B', pivoted upon said bracket, as at $b$, as in my prior machines of this general form. In said prior machines the crank $b'$ and its shaft $b^2$ were mounted upon the wheel-arm B'; but now said crank and shaft have bearings in a rearwardly-projecting hanger, $b^3$, integral with said bracket below the wheel-arm.

The chain of gearing from the crank-shaft to the grinding-wheel is substantially as in my prior machine; but the outer bearings for the wheel-shaft and the shaft of the adjacent gear are slightly differently formed, being now on a hanger extended downward from the wheel-guard and integral with the arm B', instead of being extended upward, as in said prior machines.

The base-clamp C, by which the machine may be securely mounted upon the wheel of a mowing-machine, as for use, differs from those previously used by me in that instead of four but three jaws are now used—two at one side, as before, and one centrally opposite, as at $c$, on a single bolt, $c'$, provided with the thumb-nut $c^2$. I find that the one bolt and one jaw amply serve the purpose, thus lessening the weight and the cost of that portion of the machine.

The knife-clamp frame D is pivoted on a horizontal bolt at $d$ to the base-plate of the machine in my prior machines; but it is now provided with a pair of arms, $e$, slightly above the plane occupied by the pivot $d$, and projecting toward but at both sides and beneath the grinding-wheel, as clearly indicated in Figs. 1 and 2. On the base-plate below the wheel there is a bow-shaped lever, $f$, pivoted at $f'$ to the base-plate, and at its two ends, $f^2$, bearing downward upon the coincident ends of the arms $e$ of the clamp-frame. At the bow end of the lever $f$ there is a hook, $f^3$, by which one end of a contractile spiral spring, $g$, is attached for flexibly coupling said lever $f$ with the wheel-arm B', said spring at its upper end being connected to a screw-threaded rod or link, $g'$, which extends through a hole in said wheel-arm and is provided with a thumb-nut, $g^2$, bearing on said arm, by means of which said spring may be adjusted to any desired tension, and to correspondingly vary the force with which the knife-clamp is normally forced toward the grinding-face of the wheel. The point of connection between said spring and its link and the wheel-arm B' is located between the pivotal point $b$ and the grinding-wheel, and therefore, as said wheel is raised by depressing the opposite end of said arm by means of its handle $h$, the tension on said spring is gradually increased, so that on commencing to grind a mower-knife at the bottom of a V the spring will exercise its normal or least pressure, but as the wheel is raised for grinding upwardly toward the outer ends of the knife-sections the tension of said spring is gradually increased until its extreme pressure is developed while grinding at the outer ends or tips of the edges. The rear end of the bow-lever $f$ at its under side abuts upon a projecting portion of the bracket B, thus enabling the latter at $f^4$ to serve as a stop, by means of which the knife clamp frame is confined against undue movement rearward or away from the grinding-wheel.

The bracket-arm of the wheel-frame, as in my prior machines, has a forwardly-projecting stud below the wheel, serving as a stop, $i$, by means of which and two adjacent abutments the extent of the lateral swinging movement is restricted, and in said prior machines said abutments were fixed portions of the machine; but I have now devised adjustable stops by means of which the angular relations of the grinding-face and a knife-edge can be varied, to provide for grinding knives which have not been previously ground with desirable uniformity. As shown in Figs. 4 and 5, said stop-abutments $i'$ $i'$ are vertical studs on a flat plate, $k$, pivoted at one side, near one end, as at $k'$, to the base-plate, and at the other end provided with a curved slot, $k^2$, occupied by a vertical screw-post, $k^3$, projecting upwardly from the base-plate, and provided with a washer and a thumb-nut, $k^4$, thus enabling said stops or abutments to be swung slightly to either side of their normal position and permitting all variations in the angular relations of the knife-clamp and grinding-face which could be desirable for operating upon mower-knives which have been imperfectly or irregularly ground prior to the use of my machines thereon. It will be obvious that it is immaterial in what particular manner these stops or abutments $i'$ $i'$ are rendered adjustable, as will be hereinafter made apparent in connection with other forms of my machine.

The vertical pivot or bolt at E, by which the wheel-frame and knife-clamp frame are swiveled with relation to each other, is as in certain of my prior machines, and the base-plate E' is changed in form only so far as to harmonize with the several variations in other portions of the machine. It must not, however, be understood that with my present features of invention the pivot or bolt E is, of necessity, the only direct means of connection between the wheel-frame and the base-plate, or between the wheel-frame and the knife-clamp frame, as will hereinafter be fully shown in connection with one form of my machine in which the plate which carries the adjustable stop-abutments serves, also, as an intermediate connecting-link between the wheel-frame and the base-plate.

The knife-clamp F (shown in Figs. 1, 2, 3, 13, and 14) differs in many respects from that shown in Fig. 21, the latter being substantially as shown in my said Letters Patent. My present clamp has a knife-seat at $l$ on a horizontal bar, $l'$, which is a portion of the clamp-frame D, and at the ends of said bar there are stationary jaws $l^2$ $l^2$, and for each of these there is a loose jaw, $m$ $m'$, having a bearing-point below said bar at $m^2$ for contact with a corresponding portion of the coincident stationary jaw, and each pair of jaws has a threaded bolt, $n$, and a thumb-nut, $n'$. The clamping-face of each pair of jaws is at $n^2$, between which a knife-section is clamped above the knife-bar, as clearly indicated in Fig. 13. At a nearly central point on said knife-seat there is a vertical bolt, $o$, having a head which will just overlie the edge of the knife-bar when a knife is in the clamp, as for grinding. As in my prior machines, this bolt serves as a gage for locating the dividing-line between two knife-sections, although in this case it is one edge of the head that serves as a gage-point, as indicated, instead of the center, as in my prior machines; and so, also, does this bolt, by the contact of its head with the outer edge of a knife-bar, contribute to convenience in adjusting a knife in the clamp. For conveniently throwing the clamp rearward one of the loose jaws, $m$, is provided with a thumb-piece, $n^3$. In using this clamp it will be seen that the bolt $o$ serves to prevent a mower-knife, $n^4$, from tilting endwise and edgewise, and hence one pair of these clamping-jaws can be set so as to confine, but not tightly engage with, a knife section, and not require any manipulation of its clamping-bolt during the grinding of all but one section of an entire mower-knife, the other pair of jaws doing nearly all the actual clamping duty.

For better enabling the clamp to thoroughly control a heavy knife while grinding an end section, I prefer to construct the loose jaw $m$ as illustrated in Figs. 15 and 16, wherein said jaw is shown as having the thumb-piece $n^3$ and also a laterally-extending arm, $m^3$, which enables this jaw to maintain its control over a knife even when no knife-section is interposed and clamped between the main faces of the jaws, it being obvious that the vertical bolt $o$ serves as a clamping-face for the rear side of a knife and that it co-operates with the arm $m'$ when the latter is forced against the opposite side of a knife.

Referring now to the novel combination which includes the spring $g$, as shown in Figs. 1, 2, and 3, it is not to be understood that said spring must be of the contractile variety, because an expansive spring may as well be employed, as illustrated in Fig. 8, wherein the lever $f$ has a tail-piece and a vertical strap, $f^5$, within which is an expansive rubber spring, $g$, through which the link or rod $g'$ passes, the latter having a nut or head at its lower end and a washer intervening between said nut and the lower end of the spring. In lieu of springs of either of these varieties, a plate-spring may be employed, as illustrated in Figs. 6 and 7, wherein the bow-shaped lever $f$ is composed of three parts. The pivoted portions $f^6$ are rigid, but the rear portion is bow-shaped and has a central integral tongue-piece, $f^7$, all composed of spring-steel plate well proportioned for the duty to be performed, the tongue-piece being coupled to the link $g'$, as before described.

In Figs. 17 to 20, inclusive, I have illustrated portions of one form of my machine in which the wheel-frame bracket B is as before described; but the base clamp-plate, E', is not directly swiveled to said bracket by the pivot or bolt E. In this instance the plate $k$ is pivoted to the base-plate E' by means of the pivot-bolt at $k'$, and said plate $k$ has at its opposite side a bearing or sleeve, $k^5$, for the reception of the pivot-bolt E. The knife-clamp frame is pivoted upon the base-plate as in the other forms of machine, and therefore the general pivotal relations of the grinding-wheel and the knife-clamp are as before described, although the plate $k$ serves not only as a carrier for the stop-abutments $i'$, but also as an intermediate connecting-link between the grinding-wheel frame and the base-plate on which the knife-clamp is mounted. This plate $k$, like the similar plate before described, has a curved slot, $k^2$, occupied by the screw-post $k^3$, having a washer and thumb-nut, $k^4$, all as previously described, for enabling the adjustment of the stops $i'$ and confining them in position.

The spring $g$ is here shown in dotted lines with its lower end connected to the lever $f$, and the latter, instead of being bow-shaped, has but one curved arm, and its end $f^2$ engages at but one point with the knife-clamp frame D, as at $e$, instead of at two points, as in the instances previously described.

It is now to be understood that this feature of my invention, by which progressively-increased spring-force is applied to the knife-clamp during the grinding-contact of the wheel and knife, starting from the bottom of a V and grinding thence to the tip of an edge, is not restricted to those forms of my machine in which the grinding-wheel is vertically reciprocated, as it will now be made obvious that similar results will accrue if the spring be properly applied to a knife-clamp and frame which can be vertically reciprocated while the wheel is rotated on a non-reciprocating arm. In the complex form of machine shown in Fig. 21 the knife-clamp is pivoted to the clamp-frame D upon a supplemental frame, as at $d$, so that the clamp can be vertically reciprocated by means of the hand-lever $p$, as shown and described in my aforesaid Letters Patent, and, as in said prior machine, a spring, $p'$, performs the lifting movement of the clamp-frame after it has been depressed by the hand-lever. A knife-clamp spring was also used in said prior machine; but it was seated at one end upon a cross-bar between the arms, by which the knife-clamp was pivotally coupled to the knife-clamp frame, and said spring was slightly inclined forwardly to its point of contact with the knife-clamp. In my improved machine the spring $g^3$ has its rear end abutted against the side of a slotted standard, $g^4$, and it encircles a rod, $g^5$, (provided with an adjusting-nut, $g^{12}$,) so that as the knife-clamp is depressed, as for grinding a knife-edge from the bottom of a V outwardly, said spring is progressively compressed and caused to exert a gradually-increased pressure of a knife in the clamp upon the grinding-face of the wheel, and in a manner as closely approximating to the operation of the spring $g$ before described as I believe to be possible, when said spring is not directly controlled and graduated by the movements of the wheel-arm in the simpler forms of machine.

In said Fig. 21 the form of knife-clamp shown is the same as that disclosed in my said Letters Patent; but the forms herein disclosed can be used in this complex form of machine, as is illustrated in Fig. 22, wherein the spring $g^6$ is of the simple bent variety and composed of spring plate metal, secured at one end by means of a slot therein and an adjusting clamp-screw, $g^7$, to the standard $g^4$, which, as before described, projects upwardly from the base portion of a knife-clamp frame, and at its other end it abuts against the rear of the knife-clamp in a suitable seat, so that as the clamp is depressed the force of the spring is progressively increased in the direction of the grinding-wheel and progressively lessened as the clamp rises, thus affording the same results as with the springs of the spiral form.

It will be observed that in the form of machine shown in Fig. 1 the knife-clamp spring is coupled to the wheel-arm between its pivot $b$ and the wheel, and also that it has been shown that said location of the coupling-point will admit of the use of either contractile or expansive springs. It is now to be understood that said coupling-point can be located between the wheel-arm pivot and the outer end or handle of said arm without materially impairing the results. In this complex form of machine, Fig. 21, the knife-clamp can be locked against vertical reciprocation and the wheel-arm then unlocked, so that the grinding-wheel can be vertically reciprocated.

It will be readily obvious that in the simple form of machine shown in Fig. 1 the bow-shaped lever $f$ is constructed separately from the knife-clamp arms $e$, simply because the force of the spring is increased by the upward movement of that portion of the wheel-arm to which it is coupled, and hence, if said spring be coupled to and controlled by a portion of the wheel-arm which moves downward from its normal position, said arm $e$ may be extended below and beyond the pivot $b$ of the wheel-arm, as shown in Fig. 21. With the clamp-arms $e$ thus extended, of course the pressure must be exerted downwardly, and hence the spring $g^8$ abuts at its lower end upon said clamp-arms $e$, (the two being coupled at their rear ends in bow form,) and its upper end abuts against the adjusting nut $g^9$ on the rod $g^{10}$, which at its upper end abuts against a seat on the under side of the wheel-arm and at its lower end passes freely through a hole in said clamp-arms $e$. This arrangement of the pressure-graduating spring, so far as its rod and adjusting-nut go, is the same as in the case of the spring $g^3$, before described. It will be readily obvious that in operating a complex machine like that shown in Fig. 21 both clamp-springs $g^3$ and $g^8$ could not be used at the same time, and hence either can be readily displaced or rendered inoperative; but a machine thus organized, being capable of use under all possibly-desired conditions, cannot fail to meet the varied preferences or requirements of its users.

It will also be readily seen that however the clamp-controlling spring may be operatively coupled to the knife-clamp by way of the wheel-arm, or however varied the spring may be in form, it will operate in substantially the same way to press the knife-clamp toward the grinding-wheel with a gradually-increased force in grinding from the bottom of a V to the tip of an edge, as a result of that reciprocating movement by which the entire knife-edge is progressively subjected to contact with the grinding-surface of the wheel; and it will also be as readily seen that when said clamp-controlling springs are not controlled by the pivoted wheel-arm (as with the springs $g^3$ and $g^6$, Figs. 21 and 22) they are also graduated in force as the result of that same reciprocatory movement effected by the hand-lever $p$, which is pivoted upon the wheel-arm bracket and is vibrated vertically like the wheel-arm in the other forms of machine, thus clearly indicating the fact that the wheel-arm B', when vibrated to progressively vary the force of the clamp-controlling spring, is no more than a hand-lever operatively coupled to said spring, and in this particular combination it is therefore the equivalent of the hand-lever $p$.

If the spiral springs be composed of steel, it is generally desirable to loosely house them for protection against undue corrosion, and to accomplish this a cup-sleeve, $g^{11}$, as shown in Fig. 21 on the spring $g^8$, can be employed with good results on any of the spiral springs.

This complex form of machine can, obviously, be provided with adjustable stops or abutments mounted on a plate, as in the simpler forms of my machine; but instead of the swinging plate I have here shown simple stop-screws $i^2$, the inner ends of which serve as adjustable stops or stop-abutments, with which the wheel-frame stop $i$ can be made to variably engage, and thus enable the knife-clamp and wheel to be adjusted for grinding irregularly-ground knives, although this form of adjustable stops is not deemed by me so convenient and desirable as those previously described.

Having thus described my invention, I claim as new and desire to secure by Letters Patent—

1. In a machine for grinding mowing-machine knives, the combination, substantially as hereinbefore described, of a knife-clamp, a grinding-wheel, means for reciprocating either of them for presenting to the grinding-surface a knife-edge progressively from the bottom of a V to the tip of an edge, and a clamp-controlling spring which exerts its minimum force during the presentation by the clamp of the inner end of a knife-edge to the grinding-surface and a greater force when presenting the outer end or tip of a knife-edge to said surface, and is coupled to the reciprocating mechanism and graduated in its force thereby, substantially as described, whereby the pressure of a knife held by said clamp is increased progressively against the grinding-surface while grinding from the bottom of a V to the tip of a knife-edge.

2. In a machine for grinding mowing-machine knives, the combination, substantially as hereinbefore described, of a knife-clamp, a grinding-wheel mounted upon a reciprocating arm or lever, and a clamp-controlling spring coupled to said wheel-arm and varied in its force while pressing a knife against the grinding-surface as a result of the various positions assumed by said wheel-arm during its reciprocatory movement.

3. In a mower-knife-grinding machine, the combination, substantially as hereinbefore described, of a grinding-wheel mounted at one end of a pivoted arm, a knife-clamp frame pivoted to swing toward and from the grinding-face of said wheel, arms at the foot of said frame, a pivoted lever bearing downward upon said arms, and a clamp-controlling spring coupled to the opposite end of said lever and also to said wheel-arm between its pivot and the wheel, whereby as the result of vertically moving said wheel the pressure of said spring applied at the rear of the clamp-frame is progressively increased.

4. In a mower-knife-grinding machine, the combination, substantially as hereinbefore described, of the grinding-wheel and the knife-clamp pivoted with relation to each other, substantially as described, for enabling the presentation of a knife held by said clamp to either of the edges of the face of the grinding-wheel, and adjustable stops for variably limiting the pivotal movements of said wheel and clamp, and thereby correspondingly varying their angular relations for operating upon the sections of a mower-knife which has been irregularly ground.

5. In a mower-knife grinder, the knife clamp embodying the combination, substantially as described, of the horizontal bar provided with legs pivoted at their lower ends and having an upper surface affording a longitudinal seat for the rear edge of a knife-bar and having a centrally-located bolt affording a shoulder for engaging with the outer edge of a knife-bar, and two pairs of independent vertical clamping-jaws located at opposite sides of said bolt, whereby the central portion of a mower-knife may be securely confined by the use of either or both of said pairs of jaws, and also whereby either of the pairs of jaws and said bolt-shoulder can be relied upon for securely holding either end of a knife while grinding the end sections thereof.

6. The combination, substantially as hereinbefore described, of the grinding-wheel, the knife-clamp and its frame, the latter being pivoted at its lower end to a base-plate, a horizontal bar on said frame serving as a seat for the rear edge of a mower-knife bar, a rigid clamping-jaw at each end of said bar, a pair of movable jaws, each provided with a separate clamping-bolt, forwardly-projecting arms at the base of said clamp-frame, and a spring for forcing said arms downward and thereby forcing the knife-clamp toward the grinding-face of the wheel.

7. In a mower-knife grinder, the combination, with a grinding-wheel internally chambered for the reception of water, of a radial water-duct having an external feeding-aperture and an internal exit located within the wheel, substantially as described, whereby water can be readily supplied to the chamber and then securely retained therein without closing said duct, regardless of variations in the position of said wheel, and whether the same be in or out of use.

RUFUS DUTTON.

Witnesses:
C. H. PINNHOUR, Jr.,
W. N. GAY.